United States Patent
Keyes et al.

(10) Patent No.: US 11,790,793 B2
(45) Date of Patent: **\*Oct. 17, 2023**

(54) SYSTEMS AND METHODS FOR MODEL BASED VEHICLE NAVIGATION

(71) Applicant: Honeywell International Inc., Charlotte, NC (US)

(72) Inventors: Sally Ann Keyes, Minneapolis, MN (US); Dean Richard Wilkens, Scottsdale, AZ (US); Dale F Enns, Roseville, MN (US)

(73) Assignee: Honeywell International Inc., Charlotte, NC (US)

( * ) Notice: Subject to any disclaimer, the term of this patent is extended or adjusted under 35 U.S.C. 154(b) by 211 days.

This patent is subject to a terminal disclaimer.

(21) Appl. No.: 17/144,826

(22) Filed: Jan. 8, 2021

(65) Prior Publication Data
US 2022/0223054 A1 Jul. 14, 2022

(51) Int. Cl.
*G08G 5/00* (2006.01)
*B64F 5/60* (2017.01)
*G01C 21/18* (2006.01)

(52) U.S. Cl.
CPC ............ *G08G 5/0047* (2013.01); *B64F 5/60* (2017.01); *G01C 21/18* (2013.01)

(58) Field of Classification Search
CPC ......... G08G 5/0047; B64F 5/60; G01C 21/18; G01C 21/16; G01C 21/20
See application file for complete search history.

(56) References Cited

U.S. PATENT DOCUMENTS 5,075,861 A * 12/1991 Hasson ................ G02B 27/644
                                                          318/648
6,163,021 A    12/2000 Mickelson
(Continued)

FOREIGN PATENT DOCUMENTS

CN      106679657 B    10/2019
CN      111708377 A     9/2020
(Continued)

OTHER PUBLICATIONS

Bryson et al., "Vehicle Model Aided Inertial Navigation for a UAV using Low-cost Sensors", Jan. 2004, pp. 1 through 10.
Koifman et al., "Inertial Navigation System Aided by Aircraft Dynamics", IEEE Transactions on Control Systems Technology, Jul. 1999, pp. 487 through 493, vol. 7, No. 4, IEEE.
Lie et al., "Synthetic air data system", Journal of Aircraft, Jul.-Aug. 2013, pp. 1234-1249, vol. 50, No. 4.
(Continued)

*Primary Examiner* — Mussa A Shaawat
(74) *Attorney, Agent, or Firm* — Fogg & Power LLC

(57) ABSTRACT

Systems and methods for model based vehicle navigation are provided. In one embodiment, a navigation system: a strapdown navigation processor; a propagator-estimator filter, the navigation processor configured to input inertial sensor data and navigation corrections from the filter to generate a navigation solution comprising a vehicle velocity estimate and a vehicle attitude estimate; a vehicle physics model configured to perform calculations utilizing dynamics equations for a rigid body. The model inputs 1) vehicle state estimates from the navigation solution and 2) platform inputs indicative of forces acting on a vehicle platform. The model outputs a set of three orthogonal predicted translational acceleration measurements based on the inputs. The filter comprises a measurement equation associated with the model and is configured to input the navigation solution and inertial sensor data, and to input and process the translational acceleration measurements as a navigation aid to generate the navigation corrections.

20 Claims, 2 Drawing Sheets

(56) References Cited

U.S. PATENT DOCUMENTS

Figure 1:
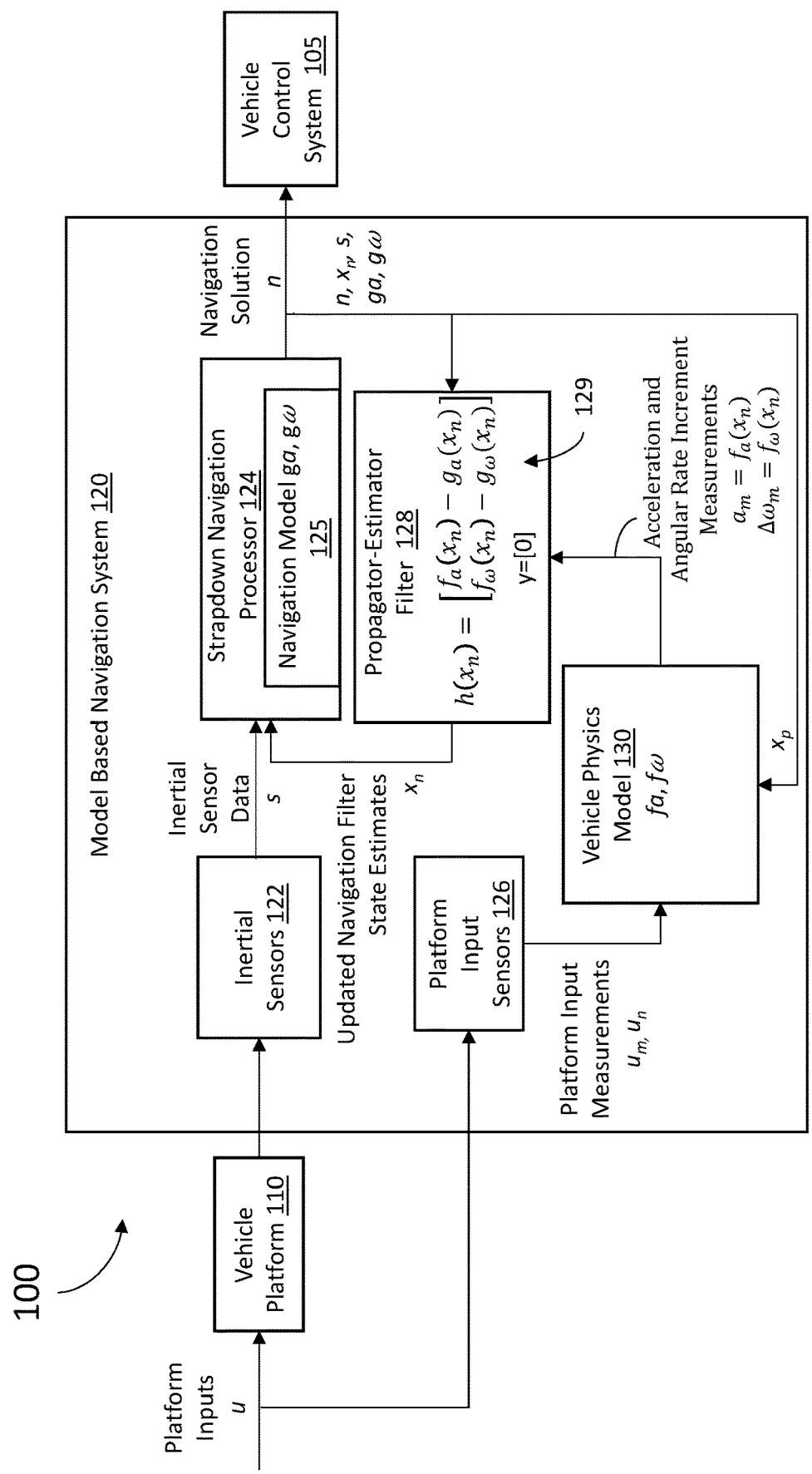

| | | | |
|---|---|---|---|
| 6,208,936 B1* | 3/2001 | Minor | G01S 19/18 |
| | | | 701/472 |
| 7,395,987 B2* | 7/2008 | Lindquist | F41G 7/222 |
| | | | 244/3.21 |
| 7,409,290 B2 | 8/2008 | Lin | |
| 8,219,267 B2 | 7/2012 | Hamke et al. | |
| 8,416,130 B2 | 4/2013 | Scherzinger | |
| 8,457,882 B2 | 6/2013 | Pyne et al. | |
| 9,428,279 B2 | 8/2016 | Ganguli et al. | |
| 9,435,661 B2 | 9/2016 | Brenner et al. | |
| 9,702,674 B2 | 7/2017 | Fairfax et al. | |
| 9,978,285 B2 | 5/2018 | Khaghani et al. | |
| 10,417,469 B2 | 9/2019 | Davidson et al. | |
| 10,648,814 B2 | 5/2020 | Hardt et al. | |
| 10,989,539 B1* | 4/2021 | Frey, Jr. | G01C 21/16 |
| 2002/0008661 A1* | 1/2002 | McCall | G01S 19/47 |
| | | | 701/472 |
| 2008/0269963 A1* | 10/2008 | Vos | G01C 21/165 |
| | | | 701/4 |
| 2010/0121601 A1 | 5/2010 | Eckert | |
| 2016/0349026 A1* | 12/2016 | Fairfax | G01C 21/08 |
| 2017/0016728 A1* | 1/2017 | Sheard | G05D 1/10 |
| 2017/0160306 A1* | 6/2017 | Sheard | G05D 1/108 |
| 2017/0322030 A1* | 11/2017 | Sheard | G01C 25/005 |
| 2017/0363428 A1* | 12/2017 | Faulkner | G01C 21/165 |
| 2018/0112983 A1* | 4/2018 | Ahmed | G01C 21/30 |
| 2018/0340779 A1* | 11/2018 | Faulkner | F42B 15/01 |
| 2020/0064136 A1* | 2/2020 | Henderson | G01C 25/005 |
| 2021/0197918 A1* | 7/2021 | Goto | B62K 11/007 |
| 2022/0282955 A1* | 9/2022 | Keyes | F41G 7/007 |

FOREIGN PATENT DOCUMENTS

| | | | |
|---|---|---|---|
| JP | 5569681 B2 | 8/2014 | |
| KR | 101846019 B1 | 4/2018 | |

OTHER PUBLICATIONS

Zahran et al., "Hybrid Machine Learning VDM for UAVs in GNSS-denied Environment", Journal of the Institute of Navigation, 2018, pp. 477 through 492, vol. 65, No. 3, Navigation.

Khaghani et al., "Autonomous and Non-Autonomous Dynamic Model Based Navigation System for Unmanned Vehicles", Navigation-Journal of the Institute of Navigation, 2016, pp. 345 through 358, vol. 63, Issue 3, Abstract pp. 1 through 3.

Keyes, Sally A. et al., "Systems and Methods for Model Based Inertial Navigation for a Spinning Projectile", U.S. Appl. No. 17/192,535, filed Mar. 4, 2021, pp. 1 through 28, Published: US.

European Patent Office, "Extended European Search Report from EP Application No. 22156504.7", from Foreign Counterpart to U.S. Appl. No. 17/192,535, dated Aug. 3, 2022, pp. 1 through 9, Published: EP.

Cork, Lennon, "Aircraft Dynamic Navigation for Unmanned Aerial Vehicles", PhD dissertation, May 29, 2014, pp. i through 203, Brisbane, AU, Retrieved from the internet: http:\\eprints.qut.edu.au/71396/1/Lennon_Cork_Thesis.pdf, retrieved on Nov. 16, 2016.

European Patent Office, "Extended European Search Report from EP Application No. 21217658.0", from Foreign Counterpart to U.S. Appl. No. 17/144,826, dated Jun. 23, 2022, pp. 1 through 8, Published: EP.

U.S. Patent and Trademark Office, "Office Action", U.S. Appl. No. 17/192,535, dated Dec. 22, 2022, pp. 1 through 24, Published: US.

U.S. Patent and Trademark Office, "Notice of Allowance", U.S. Appl. No. 17/192,535, dated Mar. 29, 2023, pp. 1 through 14, Published: US.

Fairfax et al., "Position Estimation for Projectiles Using Low-cost Sensors and Flight Dynamics", ARL-TR-5994, Apr. 2012, Army Research Laboratory, Aberdeen Proving Ground, MD, Page(s) Cover through 32.

Hegrenaes, et al., "Model-Aided Intertial Navigation for Underwater Vehicles", In proceedings of the IEEE International Conference on Robotics and Automation, Pasadena, California, USA, 2008, pp. 1 through 8.

* cited by examiner

SYSTEMS AND METHODS FOR MODEL BASED VEHICLE NAVIGATION

BACKGROUND

Many emerging vehicle technologies, such as for Urban Air Mobility (UAM), involve small, lightweight aircraft that utilize simplified vehicle operations (SVO) to augment pilot control of the vehicle. For vehicles implementing SVO, accurate velocity and attitude feedback to the vehicle's navigation control system greatly reduces the pilot's workload and necessary training. However, when off-vehicle navigation aid sources (such as Global Navigation Satellite Systems (GNSS) for example) are not available, accurate velocity feedback typically relies on the on-vehicle presence of high grade inertial sensors to measure vehicle linear acceleration and angular velocity, such as navigation grade inertial measurement units (IMUs). However, navigation grade IMUs are bulky and substantially more expensive when compared to low-grade inertial sensors (such as tactical and industrial grade sensors) that work in conjunction with GNSS navigation aids to produce usable navigation solutions.

For the reasons stated above and for other reasons stated below which will become apparent to those skilled in the art upon reading and understanding the specification, there is a need in the art for systems and methods for model based vehicle navigation.

SUMMARY

The Embodiments of the present disclosure provide methods and systems for systems and methods for model based vehicle navigation and will be understood by reading and studying the following specification.

In one embodiment, a navigation system for a vehicle comprises: a strapdown navigation processor; a propagator-estimator filter, wherein the strapdown navigation processor is configured to input inertial sensor data and to input navigation corrections from the propagator-estimator filter to generate a navigation solution, the navigation solution comprising at least a vehicle velocity estimate and a vehicle attitude estimate; and a vehicle physics model configured to perform calculations utilizing dynamics equations for a rigid body, wherein the vehicle physics model inputs 1) vehicle state estimates from the navigation solution and 2) platform inputs indicative of forces acting on a vehicle platform, and the vehicle physics model outputs at least a set of three orthogonal predicted translational acceleration measurements based on the inputs; wherein the propagator-estimator filter comprises a measurement equation associated with the vehicle physics model and is configured to input the navigation solution and inertial sensor data, and to input and process the set of predicted translational acceleration measurements from the vehicle physics model as a navigation aid, to generate the navigation corrections.

DRAWINGS

Figure 2:
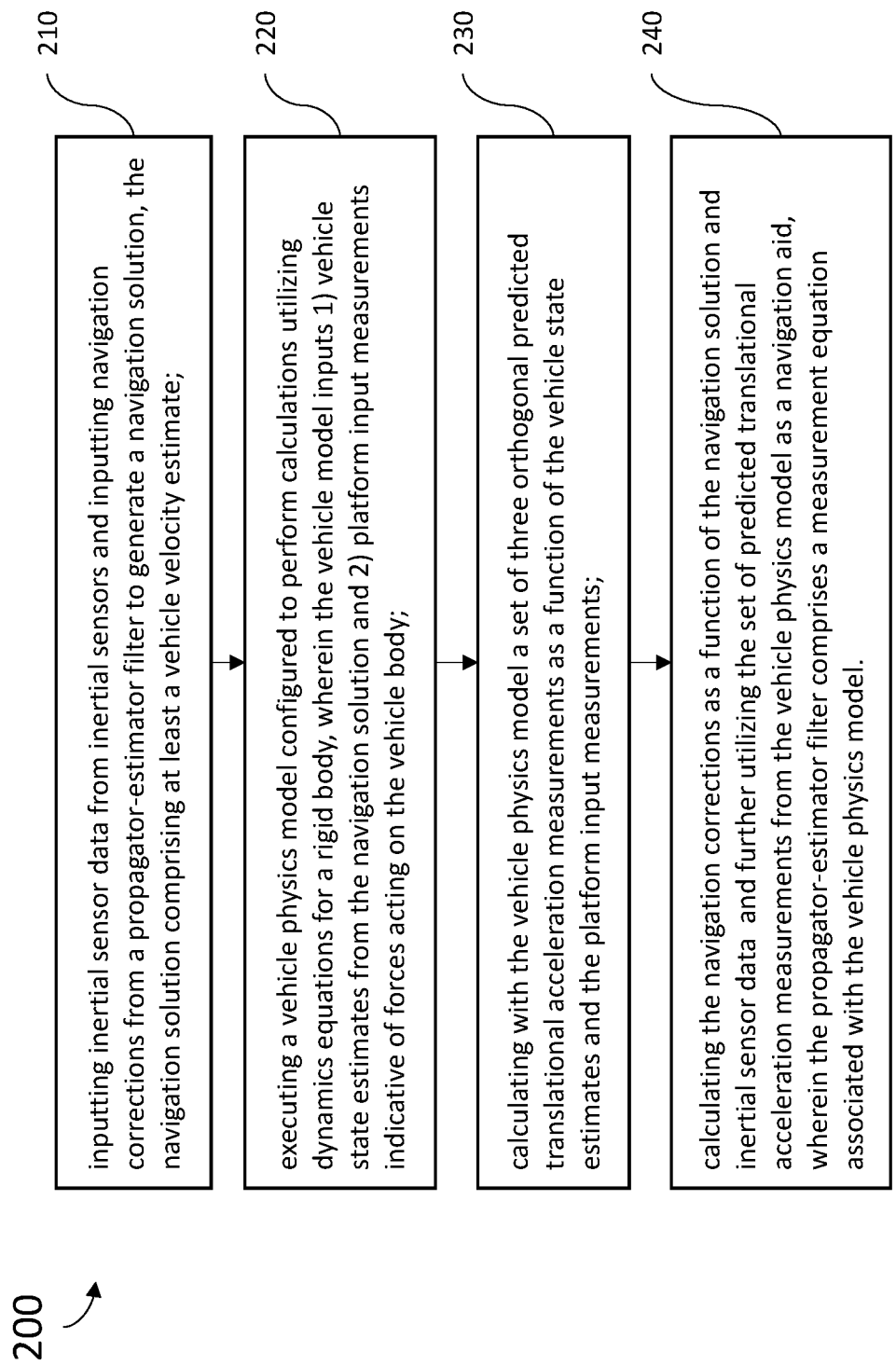

Embodiments of the present disclosure can be more easily understood and further advantages and uses thereof more readily apparent, when considered in view of the description of the preferred embodiments and the following figures in which:

FIG. 1 is a block diagram illustrating an example embodiment of a model based vehicle navigation system; and FIG. 2 is a flow chart illustrating example method embodiment for model based vehicle navigation.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide for navigation systems and methods for vehicles that generate navigation solutions without the need for navigation grade inertial sensors or off-vehicle navigation aid sources. In some embodiments, a navigation system comprises a vehicle physics model that generates and outputs acceleration measurements that are utilized as inputs to a propagator-estimator filter, which, as a function of those acceleration measurements (and other measurement states as discussed below), outputs navigation corrections to a strapdown navigation process. The result is a navigation aid that is able to bound navigation errors in vehicle velocity and/or attitude measurements to acceptable levels for SVO navigation purposes, rather than producing navigation errors that may indefinitely grow over time. Bounding velocity errors may also serve to limit potential growth in estimates of vehicle position.

As discussed in greater detail below, the vehicle physics model is an aircraft aerodynamic and propulsion model that utilizes dynamics equations for a rigid body. In this context, the vehicle physics model represents the underlying physics that drive the equations of motion corresponding to vehicle dynamics. That is, the vehicle physics model provides a relationship between platform input measurements indicative of forces acting on the vehicle body (such as throttle or motor RPM that generate propulsion forces, control surface deflection that affects aerodynamic forces, or wind velocity that affects aerodynamic forces), vehicle states (such as not limited to attitude and velocity) and the resulting linear and angular accelerations. In some embodiments, the vehicle physics model is incorporated into the navigation estimation algorithm by formulating a navigation measurement based on the knowledge of the vehicle equations of motion. Although the present disclosure primarily focuses on implementations where the vehicle 100 is an aircraft, such as a UAM and/or SVO aircraft, the embodiments discussed herein may be implemented for any form of vehicle. For example, embodiments described herein may be utilized in place of, or together with, an attitude and heading reference system (AHRS) product in a vehicle as they may be utilized to produce velocity and position information typically not available from an AHRS.

FIG. 1 is a block diagram of a vehicle 100 comprising a model based navigation system 120 of one embodiment of the present disclosure. In FIG. 1, the vehicle platform 110 represents the structural elements of the vehicle 100 (for example, like the fuselage and lifting bodies of an aircraft), with the platform inputs, u, and the vehicle states, $x_p$, representing the variables that result in the forces and moments acting on the vehicle platform 110 which may influence the linear and rotational accelerations of the vehicle 100. As such, the platform inputs, u, include engine or motor parameters such as throttle and RPM that result in vehicle generated propulsion forces generated either directly or indirectly from the vehicle's engines. For example, for an aircraft vehicle, the vehicle generated propulsion forces may include thrusts produced by jet engines (determined in part by the throttle) and/or propellers (determined in part by the RPM). For a vehicle operating on land, the vehicle generated propulsion forces may be a function of an engine or motor produced torque. For other forms of transportation vehicles, vehicle generated propulsion forces may be generated by other motivators. Additional platform inputs, u, include control surface deflection (such as aileron, elevator, or rudder deflection) that results in aerodynamic forces acting on the vehicle. The platform inputs, u, also include external variables such as wind velocity, which affects the aerodynamic forces acting on the vehicle 100. The vehicle states, $x_p$, (which include velocity and attitude) are used in the dynamics equations in the vehicle physics model 130 and are derived from the navigation solution, n, navigation filter states, $x_n$, and inertial sensor data, s. Along with the wind velocity, the vehicle states, $x_p$, can be used to determine the speed of the relative wind, the angle of attack, the sideslip angle, and the bank angle. These parameters result in aerodynamic forces and moments (such as lift and drag forces) that influence the linear and rotational accelerations of the vehicle. The inertial sensors 122 function to sense and measure the net accelerations (both linear and rotation) of the structural elements of the vehicle 100 caused by the platform inputs, u, and vehicle states, $x_p$. For example, the inertial sensors 122 may comprise sets of accelerometers and gyroscopes. In some embodiments, the inertial sensors 122 may be implemented using low-grade inertial sensors (i.e., non-navigation grade sensors such as tactical and industrial grade sensors) such a micro-electromechanical system (MEMS) accelerometers and MEMS gyroscopes or other industrial or tactical grade inertial sensors. The output from the inertial sensors 122 is raw inertial sensor data, s, which in some embodiments includes three orthogonal specific force measurements resulting from linear acceleration forces applied to the vehicle platform 110, and three orthogonal angular rate measurements resulting from rotational moments applied to the vehicle platform 110. The strapdown navigation processor 124 inputs the inertial sensor data, s, to produce a navigation solution, n, which includes at least vehicle attitude and velocity estimates. Because the inertial sensors 122 are less-than navigation grade, the navigation solution, n, if left uncorrected would accumulate errors in the vehicle attitude and velocity estimates that are unbounded. However, with embodiments of the present disclosure, navigation corrections (which may be in the form of updated navigation filter state estimates) are provided to the strapdown navigation processor 124 so that potential vehicle attitude and velocity errors are bounded. The strapdown navigation processor 124 adjusts the raw inertial sensor data, s, produced by the inertial sensors 122 as a function of the updated navigation filter state estimates resulting in a navigation solution, n, that is more accurate than what could be derived from the raw inertial sensor data, s, alone. Moreover, the potential error in the velocity and/or attitude components of the navigation solution with respect to the true velocity and attitude vehicle states is bounded so that the vehicle control system 105 may operate to control and navigate the vehicle 100 based on a navigation solution input that is accurate to within known tolerances.

With embodiments of the present disclosure, predicted acceleration forces corresponding to what the inertial sensors 122 should be sensing can be estimated based on a physics model of the vehicle platform 110 implemented by a vehicle physics model 130. As shown in FIG. 1, the model based navigation system 120 further comprises platform input sensors 126, the vehicle physics model 130 which performs calculations utilizing dynamics equations for a rigid body corresponding to the vehicle platform 110, and a propagator-estimator filter 128. It should be understood that the model based navigation system 120 may comprise one or more processors and memory programmed with code that when executed implement the functions of any of the vehicle physics model 130, propagator-estimator filter 128 or strapdown navigation processor 124.

With one or more of the embodiments presented in this disclosure, the vehicle physics model 130 computes sets of linear accelerations and optionally angular rate increments (given by the functions $f_\alpha$ and $f_\omega$) as a function of navigation filter states, $x_n$, of the propagator-estimator filter 128, and those linear accelerations and angular rate increments ($f_\alpha$ and $f_\omega$) are fed into the propagator-estimator filter 128 as an aiding source.

In the embodiments shown in FIG. 1, the platform input sensors 126 output to the vehicle physics model 130, indications of platform inputs that may be obtained from measured input ($u_m$), platform inputs that are estimated as a navigation filter state ($u_n$), or both. For example, motor RPM may be a measured input but wind velocity may be an estimated input that is one of the navigation filter states. The vehicle physics model 130 applies the measured and/or estimated platform inputs to calculate linear acceleration measurements, $a_m$, that comprise a set of three orthogonal predicted translational acceleration measurements which are provided as aiding source inputs to the propagator-estimator filter 128. In some embodiments, the linear acceleration measurement, $a_m$, may be expressed as:

$$a_m = f_\alpha(x_p, u) f_\alpha(f(n, x_n, s), [u_m, u_n])$$

where $a_m$ is the linear acceleration given by the vehicle physics model 130 and is defined by the function $f_\alpha$, which depends on platform states, $x_p$, and platform inputs, u. It should be understood that the linear acceleration measurement, $a_m$, may take the form of a vector that includes three measurement values, one for each of the vehicle platform's three orthogonal linear axes (i.e., x-axis, y-axis and z-axis) defining the set of three orthogonal predicted translational acceleration measurements. This function fa is characterized by the forces acting on the platform and the mass of the platform. The rigid body platform equations of motion include equations for the linear acceleration. The dependence on platform states can be replaced with a dependence on navigation filter states as shown in the expression above. The platform states, $x_p$, may be expressed as:

$$x_p = f(n, x_n, s)$$

The platform states, $x_p$, include at least the vehicle velocity states and may include additional vehicle states for attitude, angular rate, and position for a model derived from rigid body equations of motion. The platform states $x_p$, may be computed from the navigation solution, n, the navigation filter states, $x_n$, and the inertial sensor data, s. The navigation filter states, $x_n$, utilized by the vehicle physics model 130 correspond to navigation filter states, $x_n$, computed by the propagator-estimator filter 128. The navigation filter states, $x_n$, may include navigation and sensor errors and also may be augmented with platform inputs $u_n$ and/or other auxiliary states (e.g., $x_n, \supset u_n$). In some embodiments, the navigation filter states, $x_n$, may be obtained or derived by the vehicle physics model 130 from the output of the strapdown navigation processor 124.

In some embodiments, the vehicle physics model 130 optionally may further compute an acceleration measurement that includes three orthogonal angular rate increment measurements, $\Delta\omega_m$, which may be expressed as a function $f_\omega$ by the expression:

$$\Delta\omega_m = f_\omega(x_p, u, \Delta t) = f_\omega(f(n, x_n, s), [u_m, u_n], \Delta t)$$

which depends on platform states, $x_p$, platform inputs, u. and a specified time step, $\Delta t$. This function is characterized by the moments acting on the platform and moment of inertia or inertia tensor of the platform. It should be understood that the angular rate increment measurement, $\Delta\omega_m$, may take the form of a vector that includes three measurement values, one value for moments around each of the vehicle platform's three orthogonal linear axes (i.e., rotation around the x-axis, rotation around the y-axis and rotation around the z-axis). The rigid body platform equations of motion include equations for computing angular acceleration, which can be integrated to provide equations for angular rate increments. In some embodiments, dependence on platform states can be replaced with a dependence on navigation filter states as shown in the expression.

In some embodiments, the propagator-estimator filter 128 may comprise a Kalman filter, or variant thereof (such as an extended Kalman filter (EKF) or unscented Kalman filter (UKF), for example) or other propagator-estimator filter such as Particle filter (for example, a Sequential Monte Carlo (SMC) filter).

As would be appreciated by one of ordinary skill in the art, a propagator-estimator filter algorithm in the context of a navigation system is a filter algorithm that acts to filter and blend data from navigation sensors and navigation aids having varying degrees of accuracy, in order to establish an optimal estimate of a vehicle's navigation states. The filter algorithm implements a recursive filter which estimates one or more state variables of a dynamic system from a series of incomplete, noisy, or relatively imprecise measurements. That is, the propagator-estimator filter 128 predicts what the values of a future set of vehicle states should be based on their present values, while considering any errors that can be normally expected in that data due to noise or equipment tolerances. Propagator-estimator filter 128 produces error state estimates based on that prediction and compares those states to the next set of measurement data it receives. Any differences between the measured data and the predictions based on the updated error states represent a deviation referred to as a residual error. If the residual is small, the propagator-estimator filter 128 will attempt to correct for the error by applying the residual error (or at least some fraction of it) into its next iteration of predicted values of the navigation filter states.

With embodiments of the present disclosure, the propagator-estimator filter 128 comprises a measurement equation (such as shown at 129) associated with the vehicle physics model 130 so that when the propagator-estimator filter 128 outputs navigation corrections to the strapdown navigation processor 124, those navigation corrections will bound velocity and attitude errors in the navigation solution. In other words, the propagator-estimator filter 128 calculates the navigation corrections as a function of the navigation solution, further utilizing the set of predicted translational acceleration measurements from the vehicle physics model as a navigation aid. The measurement equation may be represented by the variable y as shown by:

$$y = h(x_n, n, s, u_m, \Delta t) = h(x_n)$$

which is a function of the navigation filter states, $x_n$, as described by the function h which computes the differences between the vehicle physics model 130 derived linear and angular accelerations and the inertial sensor 122 derived linear and angular accelerations. If all other variables in the measurement equation are considered fixed, h can be written as a function of only $x_n$. The difference between the vehicle physics model 130 derived accelerations and the inertial sensor 122 derived accelerations associated with each of the vehicle's respective linear acceleration and rotational acceleration axes should ideally be zero if the navigation filter states, $x_n$, within the propagator-estimator filter 128 are correct. Consequently, the value of the measurement equation, y, is set to zero. For example, for embodiments utilizing all three linear acceleration measurements and three angular rate measurements, y may be defined as a zero vector comprising six zeros. When the function h does not produce a y=0, the propagator-estimator filter 128 derives error residuals that form the basis for navigation corrections fed to the strapdown navigation processor 124 after each filter iteration to produce a navigation solution that drives the value of the measurement equation, y, in propagator-estimator filter 128 towards zero.

In some embodiments, further improvements in bounding errors in the navigation solution by incorporating into the strapdown navigation processor 124 a navigation model 125. The navigation model 125 comprises algorithms to compute linear accelerations and angular accelerations from the inertial sensor data, s. For example, in some embodiments the inertial sensors 122 may comprise a less-than navigation grade sensor unit (such as a MEMS sensor) that includes a set of three accelerometers and three gyroscopes. For example, in some embodiments, the inertial sensor data comprises one or more specific force measurements from a MEMS accelerometer for estimating linear acceleration. In such embodiments, the navigation model 125 can calculate from the inertial sensor data, s, a respective set of three orthogonal linear acceleration values and three orthogonal angular acceleration values. In some embodiments, to better facilitate application of the navigation solution from the propagator-estimator, the navigation model 125 executes algorithms that incorporate the navigation filter states, $x_n$, when calculating the navigation solution, n. More specifically, the navigation corrections received by the strapdown navigation processor 124 as computed by the propagator-estimator filter 128 comprise updated navigation filter state estimates. For example, a linear acceleration, $a_n$, computed by the navigation model 125 may be expressed as:

$$a_n = g_\alpha(n, x_n, s)$$

where $a_n$ is defined by the function $g_\alpha$, which depends on the navigation solution, n, the updated navigation filter state, $x_n$, estimates provided by the propagator-estimator filter 128, and the inertial sensor data, s from the inertial sensors 122. It should be understood that the linear acceleration measurement, $a_n$, may take the form of a vector that includes up to three measurement values, one for each of the vehicle platform's three orthogonal linear axes (i.e., x-axis, y-axis and z-axis). This function, $g_\alpha$, is characterized by the measured specific force, accelerometer error estimates, and the effect of attitude coupling with gravity.

Similarly, in some embodiments an angular rate increment, $\Delta\omega_n$, computed by the navigation model 125 may be expressed as:

$$\Delta\omega_n = g_\omega(n, x_n, s, \Delta t)$$

where $\Delta\omega_n$ is the change in angular rate given by the navigation model and is defined by the function $g_\omega$, which depends on the navigation solution, n, the updated navigation filter state, $x_n$, estimates provided by the propagator-estimator filter 128, the inertial sensor data, s from the inertial sensors 122, and a specified time step $\Delta t$. It should be understood that the angular acceleration measurement, $\Delta\omega_n$, may take the form of a vector that includes three measurement values, one value for moments around each of the vehicle platform's three orthogonal linear axes (i.e., rotation around the x-axis, rotation around the y-axis and rotation around the z-axis). This function $g_\omega$, is characterized by the measured angular rate and gyroscope error estimates. The navigation model 125 may compute angular rate from the inertial sensor data, s, which can be differenced at specified times to compute the change in angular rate.

Feeding back the resulting $g_\alpha$ and $g_\omega$ values into the propagator-estimator filter 128, the measurement equations, y, may be more particularly expressed as:

$$y = h(x_n) = \begin{bmatrix} a_m - a_n \\ \Delta\omega_m - \Delta\omega_n \end{bmatrix} = \begin{bmatrix} f_a(x_n) - g_a(x_n) \\ f_\omega(x_n) - g_\omega(x_n) \end{bmatrix} = [0]$$

This measurement equation is formed by differencing the vehicle physics model 130 and navigation model 125 computations for linear accelerations and changes in angular rate. As explained above, the measurement equation is computed under the condition that y=[0] because the difference between the vehicle physics model 130 calculated accelerations and navigation model 125 calculated accelerations should be zero if the navigation filter state estimates, $x_n$, are correct.

FIG. 2 is a flow chart illustrating at 200 an example method embodiment for model based vehicle navigation. It should be understood that the features and elements described herein with respect to the method 200 of FIG. 2 may be used in conjunction with, in combination with, or substituted for elements of any of the other embodiments discussed herein with respect to FIG. 1 and vice versa. Further, it should be understood that the functions, structures and other description of elements for embodiments described herein may apply to like or similarly named or described elements across any of the figures and/or embodiments describe therewith.

The method begins at 210 with inputting inertial sensor data from inertial sensors and inputting navigation corrections from a propagator-estimator filter to generate a navigation solution, the navigation solution comprising at least a vehicle velocity estimate. At 220, the method includes executing a vehicle physics model configured to perform calculations utilizing dynamics equations for a rigid body, wherein the vehicle physics model inputs 1) vehicle state estimates from the navigation solution and 2) platform input measurements indicative of forces acting on the vehicle body. As discussed above, the platform input measurements may include sensor data or derived input estimates that are indicative of forces acting on the vehicle platform. The vehicle state estimates may correspond to navigation state estimates computed by the propagator-estimator filter. At 230, the method includes calculating with the vehicle physics model a set of three orthogonal predicted translational acceleration measurements as a function of the vehicle state estimates and the platform input measurements. At 240, the method includes calculating the navigation corrections as a function of the navigation solution and further utilizing the set of predicted translational acceleration measurements from the vehicle physics model as a navigation aid, wherein the propagator-estimator filter comprises a measurement equation associated with the vehicle physics model. By incorporating into the propagator-estimator filter a measurement equation that comprises navigation states corresponding with those utilized by the vehicle physics model, the propagator-estimator filter calculates navigation corrections to the strapdown navigation processor that will bound velocity and attitude errors in the navigation solution.

EXAMPLE EMBODIMENTS

Example 1 includes a navigation system for a vehicle, the system comprising: a strapdown navigation processor; a propagator-estimator filter, wherein the strapdown navigation processor is configured to input inertial sensor data and to input navigation corrections from the propagator-estimator filter to generate a navigation solution, the navigation solution comprising at least a vehicle velocity estimate and a vehicle attitude estimate; and a vehicle physics model configured to perform calculations utilizing dynamics equations for a rigid body, wherein the vehicle physics model inputs 1) vehicle state estimates from the navigation solution and 2) platform inputs indicative of forces acting on a vehicle platform, and the vehicle physics model outputs at least a set of three orthogonal predicted translational acceleration measurements based on the inputs; wherein the propagator-estimator filter comprises a measurement equation associated with the vehicle physics model and is configured to input the navigation solution and inertial sensor data, and to input and process the set of predicted translational acceleration measurements from the vehicle physics model as a navigation aid, to generate the navigation corrections.

Example 2 includes the system of Example 1, wherein the propagator-estimator filter comprises a Kalman Filter, an Extended Kalman Filter, an Unscented Kalman Filter, or a Particle Filter.

Example 3 includes the system of any of examples 1-2, further comprising one or more platform input sensors, wherein one or more of the platform inputs are generated by the one or more platform input sensors.

Example 4 includes the system of any of examples 1-3, wherein the inertial sensor data comprises one or more specific force measurements from a MEMS accelerometer for estimating linear acceleration.

Example 5 includes the system of example 4, wherein the inertial sensor data further comprises one or more angular rate measurements from a MEMS gyroscope.

Example 6 includes the system of any of examples 1-5, wherein the navigation corrections comprise updated navigation filter state estimates.

Example 7 includes the system of any of examples 1-6, wherein the measurement equation is computed by the propagator-estimator filter as differences between vehicle physics model derived accelerations and inertial sensor derived accelerations and is a function of navigation filter states.

Example 8 includes the system of any of examples 1-7, wherein the vehicle physics model is configured to calculate dynamics equations for a rigid body corresponding to the vehicle platform.

Example 9 includes the system of example 8, wherein the vehicle physics model computes the set of predicted translational acceleration measurements as a function of navigation filter states of the propagator-estimator filter.

Example 10 includes the system of any of examples 8-9, wherein the vehicle physics model computes predicted translational acceleration measurements caused by forces acting on the vehicle.

Example 11 includes the system of example 10, wherein the strapdown navigation processor comprises a navigation model configured to compute linear accelerations and angular rate increments from the inertial sensor data and updated navigation filter state estimates from the propagator-estimator filter.

Example 12 includes the system of example 11, wherein the measurement equation is computed as a difference between vehicle physics model and navigation model computations for linear accelerations and angular rate increments and is a function of navigation filter states.

Example 13 includes the system of any of examples 1-12, wherein the vehicle is an aircraft and the inertial sensor data is generated by low-grade inertial sensors.

Example 14 includes a method for model based vehicle navigation, the method comprising: inputting inertial sensor data from inertial sensors and inputting navigation corrections from a propagator-estimator filter to a strapdown navigation processor to generate a navigation solution, the navigation solution comprising at least a vehicle velocity estimate; executing a vehicle physics model configured to perform calculations utilizing dynamics equations for a rigid body, wherein the vehicle physics model inputs 1) vehicle state estimates from the navigation solution and 2) platform input measurements indicative of forces acting on the vehicle body; calculating with the vehicle physics model a set of three orthogonal predicted translational acceleration measurements as a function of the vehicle state estimates and the platform input measurements; and calculating the navigation corrections as a function of the navigation solution and the inertial sensor data and further utilizing the set of predicted translational acceleration measurements from the vehicle physics model as a navigation aid, wherein the propagator-estimator filter comprises a measurement equation associated with the vehicle physics model.

Example 15 includes the method of example 14, wherein the navigation corrections comprise updated navigation filter state estimates.

Example 16 includes the method of any of examples 14-15, wherein the measurement equation is computed by the propagator-estimator filter as differences between vehicle physics model derived accelerations and inertial sensor derived accelerations and is a function of navigation filter states.

Example 17 includes the method of any of examples 14-16, wherein the vehicle physics model is configured to calculate dynamics equations for a rigid body corresponding to a vehicle platform.

Example 18 includes the method of example 17, wherein the vehicle physics model computes the set of predicted translational acceleration measurements as a function of navigation filter states of the propagator-estimator filter.

Example 19 includes the method of example 18, wherein the strapdown navigation processor comprises a navigation model configured to compute linear accelerations and angular accelerations from the inertial sensor data and updated navigation filter state estimates from the propagator-estimator filter.

Example 20 includes the method of example 19, wherein the measurement equation is computed as a difference between vehicle physics model and navigation model computations for linear accelerations and angular rate increments and is a function of the navigation filter states.

In various alternative embodiments, system and/or device elements, method steps, or example implementations described throughout this disclosure (such as any of the platform input sensors, inertial sensors, vehicle physics model, propagator-estimator filter, strapdown navigation processor, navigation model, vehicle control system, or any controllers, processors, circuits, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as "platform input sensors", "inertial sensors", "vehicle physics model", "propagator-estimator filter", "strapdown navigation processor", "navigation model", "vehicle control system", refer to the names of elements that would be understood by those of skill in the art of avionics and other transportation industries and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A navigation system for a vehicle, the system comprising:
a strapdown navigation processor;
a propagator-estimator filter, wherein the strapdown navigation processor is configured to input inertial sensor data and to input navigation corrections from the propagator-estimator filter to generate a navigation solution, the navigation solution comprising at least a vehicle velocity estimate and a vehicle attitude estimate; and a vehicle physics model configured to perform calculations utilizing dynamics equations for a rigid body, wherein the vehicle physics model inputs 1) vehicle state estimates from the navigation solution and 2) platform inputs indicative of forces acting on a vehicle platform, and the vehicle physics model outputs at least a set of three orthogonal predicted translational acceleration measurements based on the inputs;

wherein the propagator-estimator filter comprises a measurement equation associated with the vehicle physics model and is configured to input the navigation solution and inertial sensor data, and to input and process the set of predicted translational acceleration measurements from the vehicle physics model as a navigation aid, to generate the navigation corrections.

2. The system of claim 1, wherein the propagator-estimator filter comprises a Kalman Filter, an Extended Kalman Filter, an Unscented Kalman Filter, or a Particle Filter.

3. The system of claim 1, further comprising one or more platform input sensors, wherein one or more of the platform inputs are generated by the one or more platform input sensors.

4. The system of claim 1, wherein the inertial sensor data comprises one or more specific force measurements from a MEMS accelerometer, for estimating linear acceleration.

5. The system of claim 4, wherein the inertial sensor data further comprises one or more angular rate measurements from a MEMS gyroscope.

6. The system of claim 1, wherein the navigation corrections comprise updated navigation filter state estimates.

7. The system of claim 1, wherein the measurement equation is computed by the propagator-estimator filter as differences between vehicle physics model derived accelerations and inertial sensor derived accelerations and is a function of navigation filter states.

8. The system of claim 1, wherein the vehicle physics model is configured to calculate dynamics equations for a rigid body corresponding to the vehicle platform.

9. The system of claim 8, wherein the vehicle physics model computes the set of predicted translational acceleration measurements as a function of navigation filter states of the propagator-estimator filter.

10. The system of claim 8, wherein the vehicle physics model computes predicted translational acceleration measurements caused by forces acting on the vehicle.

11. The system of claim 10, wherein the strapdown navigation processor comprises a navigation model configured to compute linear accelerations and angular rate increments from the inertial sensor data and updated navigation filter state estimates from the propagator-estimator filter.

12. The system of claim 11, wherein the measurement equation is computed as a difference between vehicle physics model and navigation model computations for linear accelerations and angular rate increments and is a function of navigation filter states.

13. The system of claim 1, wherein the vehicle is an aircraft and the inertial sensor data is generated by low-grade inertial sensors.

14. A method for model based vehicle navigation, the method comprising:

inputting inertial sensor data from inertial sensors and inputting navigation corrections from a propagator-estimator filter to a strapdown navigation processor to generate a navigation solution for a vehicle, the navigation solution comprising at least a vehicle velocity estimate;

executing a vehicle physics model configured to perform calculations utilizing dynamics equations for a rigid body, wherein the vehicle physics model inputs 1) vehicle state estimates from the navigation solution and 2) platform input measurements indicative of forces acting on the vehicle body;

calculating with the vehicle physics model a set of three orthogonal predicted translational acceleration measurements as a function of the vehicle state estimates and the platform input measurements; and calculating the navigation corrections as a function of the navigation solution and the inertial sensor data and further utilizing the set of predicted translational acceleration measurements from the vehicle physics model as a navigation aid for the vehicle, wherein the propagator-estimator filter comprises a measurement equation associated with the vehicle physics model.

15. The method of claim 14, wherein the navigation corrections comprise updated navigation filter state estimates.

16. The method of claim 14, wherein the measurement equation is computed by the propagator-estimator filter as differences between vehicle physics model derived accelerations and inertial sensor derived accelerations and is a function of navigation filter states.

17. The method of claim 14, wherein the vehicle physics model is configured to calculate dynamics equations for a rigid body corresponding to a vehicle platform.

18. The method of claim 17, wherein the vehicle physics model computes the set of predicted translational acceleration measurements as a function of navigation filter states of the propagator-estimator filter.

19. The method of claim 18, wherein the strapdown navigation processor comprises a navigation model configured to compute linear accelerations and angular accelerations from the inertial sensor data and updated navigation filter state estimates from the propagator-estimator filter.

20. The method of claim 19, wherein the measurement equation is computed as a difference between vehicle physics model and navigation model computations for linear accelerations and angular rate increments and is a function of the navigation filter states.

* * * * *